US009735573B2

(12) United States Patent
Lindtjorn (10) Patent No.: US 9,735,573 B2
(45) Date of Patent: Aug. 15, 2017

(54) DC-POWER SYSTEM WITH SYSTEM PROTECTION CAPABILITIES

(71) Applicant: ABB Schweiz AG, Baden (CH)

(72) Inventor: John Lindtjorn, Oslo (NO)

(73) Assignee: ABB Schweiz AG, Baden (CH)

( * ) Notice: Subject to any disclaimer, the term of this patent is extended or adjusted under 35 U.S.C. 154(b) by 273 days.

(21) Appl. No.: 14/470,182

(22) Filed: Aug. 27, 2014

(65) Prior Publication Data

US 2014/0361621 A1   Dec. 11, 2014

Related U.S. Application Data

(63) Continuation of application No. PCT/EP2013/051314, filed on Jan. 24, 2013.

(30) Foreign Application Priority Data

Feb. 29, 2012   (EP) ..................... 12157487

(51) Int. Cl.
*H02J 1/06* (2006.01)
*H02H 7/26* (2006.01)

(52) U.S. Cl.
CPC .............. *H02J 1/06* (2013.01); *H02H 7/268* (2013.01); *Y10T 307/461* (2015.04)

(58) Field of Classification Search
CPC .. B63H 21/17; H01R 13/66; H02J 1/06; H02J 3/14; H02J 4/00; H02J 1/12; H02J 3/36
USPC ...................... 307/38, 31; 440/6; 439/620.24; 318/139
See application file for complete search history.

(56) References Cited

U.S. PATENT DOCUMENTS 2,813,243 A * 11/1957 Murcek ................ H02H 7/1206
                                                340/645
3,254,290 A *  5/1966 Miller .................. H02M 7/062
                                                327/535
3,887,860 A    6/1975 Bernhardt et al.
(Continued)

FOREIGN PATENT DOCUMENTS

EP   1478072 A2   11/2004
EP   1842443 A2   10/2007
(Continued)

OTHER PUBLICATIONS

Search Report and Written Opinion from the Intellectual Property Office of Singapore Application No. 11201404427U Mailing Date: Dec. 4, 2014 22 pages.
(Continued)

*Primary Examiner* — Jared Fureman
*Assistant Examiner* — Win Htun
(74) *Attorney, Agent, or Firm* — Whitmyer IP Group LLC (57) ABSTRACT

A DC-power system including a main DC bus, a power generating unit arranged to feed the main DC bus, an isolator switch arranged between the main DC bus and the power generating unit for isolating the power generating unit from the main DC bus in case of a main DC bus fault, a drive unit arranged to be fed by the main DC bus, wherein the drive unit includes a drive unit bus system, converter units connected to the drive unit bus system, and fuses arranged between the drive unit bus system and the converter units for protecting the converter units in case of a drive unit fault.

14 Claims, 4 Drawing Sheets

(56) References Cited

U.S. PATENT DOCUMENTS

| | | | | |
|---|---|---|---|---|
| 5,751,530 | A * | 5/1998 | Pelly | H02H 3/00 361/35 |
| 8,062,081 | B2 * | 11/2011 | Barrett | B63H 21/20 440/1 |
| 2003/0071633 | A1 * | 4/2003 | Fedirchuk | H02H 7/22 324/529 |
| 2004/0102109 | A1 * | 5/2004 | Cratty | B63H 21/17 440/113 |
| 2007/0002506 | A1 | 1/2007 | Papallo et al. | |
| 2007/0008664 | A1 | 1/2007 | Zeuch et al. | |
| 2007/0238362 | A1 * | 10/2007 | Newman | H02H 7/22 439/620.24 |
| 2007/0242402 | A1 * | 10/2007 | Papallo | G06F 1/12 361/63 |
| 2008/0103632 | A1 | 5/2008 | Saban et al. | |
| 2009/0176417 | A1 * | 7/2009 | Rembach | B63H 21/20 440/6 |
| 2009/0302681 | A1 | 12/2009 | Yamada et al. | |
| 2010/0231042 | A1 * | 9/2010 | Weale | H02J 4/00 307/38 |
| 2010/0292853 | A1 * | 11/2010 | McDonnell | H02J 3/34 700/287 |
| 2011/0051478 | A1 | 3/2011 | Sato et al. | |
| 2011/0298283 | A1 * | 12/2011 | Sannino | B63J 3/04 307/38 |
| 2012/0267955 | A1 * | 10/2012 | Zhan | H02J 1/06 307/31 |
| 2013/0050881 | A1 * | 2/2013 | Hafner | H02H 3/025 361/18 |
| 2013/0197704 | A1 * | 8/2013 | Pan | H02J 3/36 700/287 |
| 2013/0307444 | A1 * | 11/2013 | Settemsdal | B60L 7/14 318/139 |

FOREIGN PATENT DOCUMENTS

| | | |
|---|---|---|
| EP | 1843443 A2 | 10/2007 |
| EP | 1914162 A1 | 4/2008 |
| EP | 1936775 A1 | 6/2008 |
| GB | 1151457 A | 5/1969 |
| JP | 3041293 U | 9/1997 |
| JP | H11266532 A | 9/1999 |
| JP | 2008048544 A | 2/2008 |
| WO | 2010040613 A1 | 4/2010 |
| WO | 2010069012 A1 | 6/2010 |
| WO | 2010095241 A1 | 8/2010 |
| WO | 2011141052 A1 | 11/2011 |

OTHER PUBLICATIONS

European Search Report Application No. EP 12 15 7487 Completed: Oct. 2, 2012 4 pages.
International Preliminary Report on Patentability Application No. PCT/EP2013/051314 Completed: Jan. 31, 2014 13 pages.
International Search Report and Written Opinion of the International Searching Authority Application No. PCT/EP2013/051314 Completed: Mar. 8, 2013; Mailing Date: Mar. 20, 2013 9 pages.

* cited by examiner

DC-POWER SYSTEM WITH SYSTEM PROTECTION CAPABILITIES

FIELD OF THE INVENTION

The present disclosure generally relates to power systems and in particular to a DC-power system with protection capabilities.

BACKGROUND OF THE INVENTION

Power systems typically comprise a plurality of components, such as one or more power generation source, drives and energy storage modules. These components are typically interconnected by means of a busbar system in which currents can flow for providing power to one or more loads connected to the power system.

At some point a fault, such as a short circuit will inevitably occur in the power system, either in the busbar system, in one of the components of the system, or in a load. In case of a fault, it is important to isolate the fault from the healthy part of the system such that normal power provision can be continued by means of the healthy part, and for protecting the healthy parts from being damaged. For this purpose, a protection system is typically included in the power system.

A protection system arranged to handle faults in a power system typically comprise monitoring equipment arranged to monitor electrical parameters such as currents in the power system, and circuit breakers controlled by the monitoring equipment. The circuit breakers are arranged in such a way in the power system that selective fault isolation can be obtained in case of a fault.

US2003/0071633 discloses an AC electric power supply network (sic) comprising a bus system and feeders for distributing power to remote locations. Between each line and the bus is provided a breaker.

EP1843443 discloses a DC electrical current busbar associated with electrical load circuits and devices as well as sources requires protection. In order to provide such protection Kirchoff's laws are utilised such that electrical current values are substantially simultaneously taken and summed in order to identify deviations from expected differential threshold values. Upon detection of such deviations and generally as a result of a number of successive deviations an electrical isolation device is utilised in order to isolate electrical current to the busbar. The data set of electrical current values can be utilised in order to provide a back up protection system for individual electrical load devices and circuits, by similar comparison with expected values for those devices and circuits.

GB1151457 discloses a safety device for inverters supplying asynchronous motors. In the background section of this disclosure, it is mentioned that "in the case of faults in the inverter equipment, representing a short circuit of the d.c. circuit, the smoothing capacitor is discharged through the short circuit. Since the smoothing capacitor has a high capacitance, the discharge current may reach very high values. This causes the response of the fuses connected upstream of the current converters in known circuits. In consequence, the converters are disconnected from the short circuit."

WO2011/141052 discloses a plant for transmitting electric power comprises a high voltage DC line, a DC breaker connected in series with the DC line and configured to break a fault current upon occurrence of a fault on said DC line, means configured to detect occurrence of a fault current, a control unit configured to control a said DC breaker for protecting equipment connected to the DC line upon occurrence of a the fault current and means configured to dissipate energy stored in a faulty current path of the DC line between said location and these means upon occurrence of a said fault to the moment of said control of said DC breaker. The energy dissipating means comprises a series connection of an energy consuming braking resistor and a free-wheeling rectifying member connected between ground and said DC line to conduct current while forming a free-wheeling path therethrough upon said control of said DC breaker upon occurrence of a said fault.

Existing protection systems can however in some applications be both very expensive and space consuming.

SUMMARY OF THE INVENTION

Direct current (DC) circuit breakers are particularly large, because on the contrary to alternating current circuit (AC) breakers, they cannot depend on zero crossings. Therefore, larger air gaps are needed for DC circuit breakers to ensure proper protection. As a result, DC circuit breakers typically consume large amounts of space, and they are expensive to manufacture.

In view of the above considerations, a general object of the present disclosure is to provide a DC-power system that has protective capabilities that requires less space than the prior art.

Another object is to provide a DC-power system that is affordable.

Hence, there is provided a DC-power system comprising: a main DC bus, a power generating unit arranged to feed the main DC bus, an isolator switch arranged between the main DC bus and the power generating unit for isolating the power generating unit from the main DC bus in case of a main DC bus fault, and a drive unit arranged to be fed by the main DC bus, wherein the drive unit comprises a drive unit bus system, converter units connected to the drive unit bus system, and fuses arranged between the drive unit bus system and the converter units for protecting the converter units in case of a drive unit fault.

Thereby, the various units in the DC-power system can selectively be protected in case of faults in any of the units or on the main DC bus, without the use of large, space consuming and expensive circuit breakers.

According to one embodiment, the drive unit comprises a first type of input unit arranged between the main DC bus and the drive unit bus system, and wherein the first type of input unit comprises an isolator switch for disconnecting the drive unit from the main DC bus in case of a drive unit fault. Hence, the drive unit can be disconnected from the remaining DC-power system in case of a fault in the drive unit without the utilisation of circuit breakers.

According to one embodiment, the first type of input unit comprises a current blocking device arranged to block currents in a direction from the drive unit bus system to the main DC bus and to allow current to flow from the main DC bus to the drive unit. Thereby, fault currents that would be provided to a fault on the main DC bus or in another unit connected to the main DC bus from the capacitor banks of the converter units in the drive unit can be reduced or eliminated, as the current blocking device acts essentially as an open circuit in the direction from the drive unit bus system to the main DC bus.

One embodiment comprises an energy storage unit arranged to feed the main DC bus, wherein the energy storage unit comprises an energy storage unit bus system, power provision units, and fuses arranged between the energy storage unit bus system and the power provision units for protection of the power provision units in case of an energy storage unit fault. Thus, if a backup power component for e.g. redundancy purposes is added to the system, also this component can be protected from internal faults without the utilisation of circuit breakers.

According to one embodiment, the energy storage unit comprises a second type of input unit arranged between the energy storage unit bus system and the main DC bus, wherein the second type of input unit comprises an isolator switch for disconnecting the energy storage unit from the main DC bus in case of an energy storage unit fault. Thus, the energy storage unit can be disconnected from the main DC bus without the utilisation of circuit breakers.

According to one embodiment, the second type of input unit comprises a current blocking device arranged to block currents in a direction from the energy storage unit bus system to the main DC bus and to allow current to flow from the main DC bus to the energy storage unit, and a semiconductor switching unit for selectively allowing current to bypass the current blocking device and flow to the main DC bus. Hence, current can be allowed to flow into the main DC bus in case of additional power is needed from the energy storage unit by setting the semiconductor switching unit in its on-state. Alternatively, fault currents from the energy storage unit to a fault on the main DC bus or in another part of the DC-power system can be minimized in case the semiconductor switching unit is set in its off-state.

According to one embodiment, the current blocking device and the semiconductor switching unit are connected in anti-parallel.

According to one embodiment, the power generating unit comprises a generator and a rectifier, wherein the rectifier includes a plurality of fuses arranged to protect the rectifier in case of a rectifier fault. Thereby, internal rectifier faults can be handled by means of the fuses without utilising local circuit breakers in the power generating unit.

According to one embodiment, the plurality of fuses included in the rectifier are dimensioned such that they do not blow when subjected to fault currents as a result of faults downstream of the rectifier. Hence, fuses are only blown by currents caused by internal faults in the rectifier. Fault currents provided to faults outside the power generating unit should thus not trigger the fuse to blow. The current rating of the fuses in the rectifier should hence be selected to be at a threshold current level that is only reached or exceeded by fault currents created by rectifier faults in that particular power generating unit.

According to one embodiment, each converter unit has terminals connected to the drive unit bus, wherein each terminal of a converter unit is connected to a fuse.

According to one embodiment, the current blocking device is a diode.

According to one embodiment, the first input unit comprises a semiconductor switching unit connected in anti-parallel with the current blocking device for selectively allowing current to bypass the current blocking device and flow to the main DC bus.

By combining fuses and isolator switches as disclosed herein, a hybrid protection system is obtained where local faults, i.e. faults in a specific unit, are handled by fuses, and where global faults, i.e. faults on the main DC bus, are handled by interruption of current at the source such that an appropriate isolator switches can isolate the affected part of the DC-power system. Thereby fuse sizes can be kept smaller, ensuring that the magnitude of the local fault currents will be able to blow the fuse in case of a local fault, thus ensuring dependable DC-power system protection both locally and globally. If necessary, additional capacitor banks can be installed to provide extra fault current to ensure that fuses have enough fault current available to clear a fault.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION OF THE INVENTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
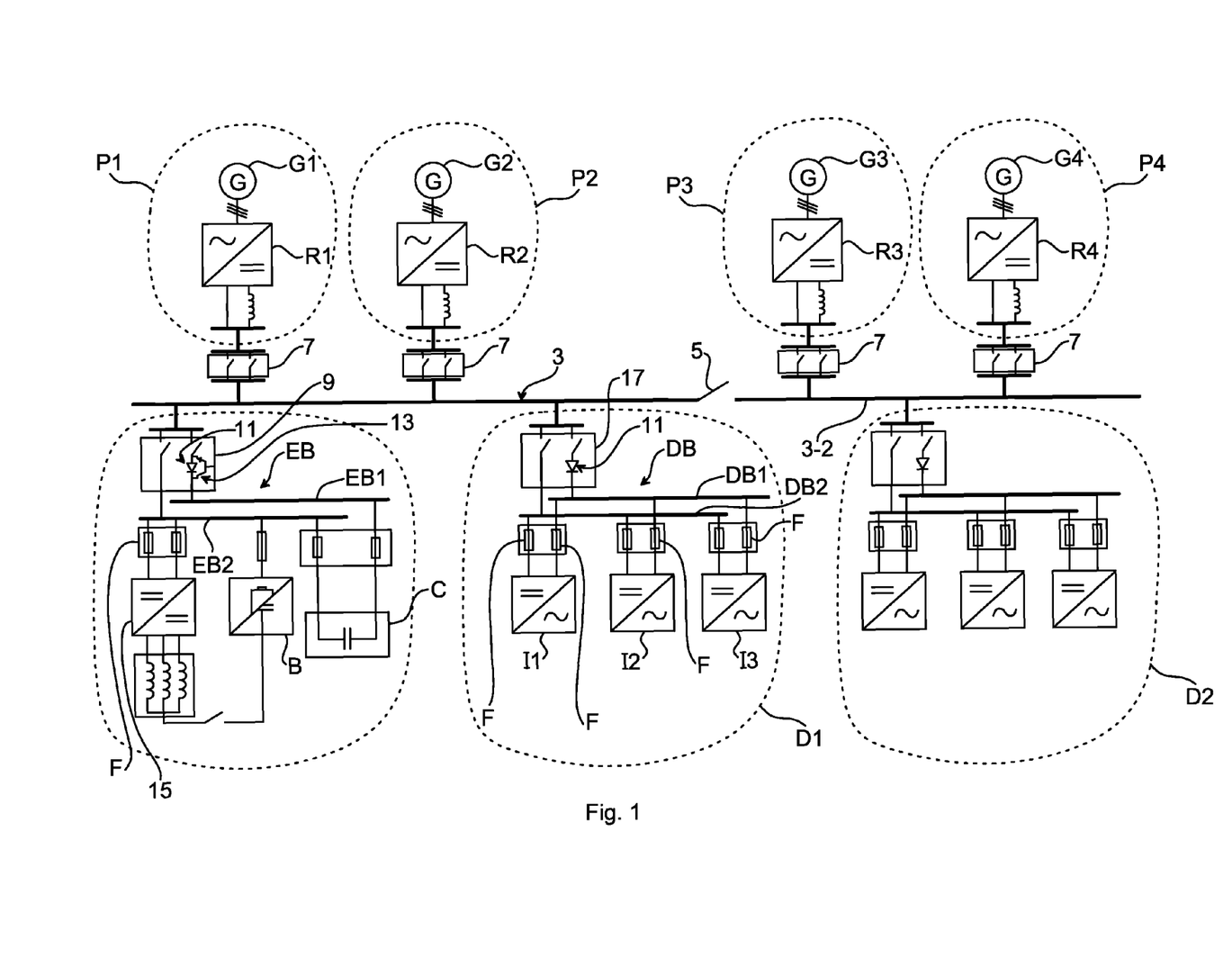
FIG. 1 is a schematic diagram of a DC-power system.

FIG. 1 depicts a schematic diagram of one example of a DC-power system 1. The DC-power system 1 comprises a main DC bus 3 having a first busbar 3-1 and a second busbar 3-2 separable by means of a bustie breaker 5, a first power generating unit P1, a second power generating unit P2, a third power generating unit P3, a fourth power generating unit P4, an energy storage unit E, a first drive D1 and a second drive D2.

The first drive unit D1 and the second drive unit D2 are arranged to power electrical motors or similar equipment. Examples of such drive units are single drives, multi drives and static frequency converters intended to supply normal AC consumers with 50 Hz or 60 Hz AC power.

The DC-power system 1 further comprises isolator switches 7, i.e. disconnectors, associated with a respective power generating unit P1, P2, P3, P4 for being able to disconnect the power generating units P1, P2, P3, P4 from the main DC bus 3. Thereby each power generating unit can be isolated from a fault on e.g. the main DC bus 3, or they can be isolated for maintenance purposes.

The first power generating unit P1 is arranged to feed the main DC bus 3, and is connectable to the main DC bus 3 via an isolator switch 7. According to the example in FIG. 1, the first power generating unit P1 is connectable to the first busbar 3-1.

The second power generating unit P2 is arranged to feed the main DC bus 3, and is connectable to the main DC bus 3 via an isolator switch 7. According to the example in FIG. 1, the second power generating unit P2 is connectable to the first busbar 3-1.

The third power generating unit P3 is arranged to feed the main DC bus 3, and is connectable to the main DC bus 3 via an isolator switch 7. According to the example in FIG. 1, the third power generating unit P3 is connectable to the second busbar 3-2.

The fourth power generating unit P4 is arranged to feed the main DC bus 3, and is connectable to the main DC bus 3 via an isolator switch 7. According to the example in FIG. 1, the fourth power generating unit P1 is connectable to the second busbar 3-2.

The first power generating unit P1 comprises a generator G1, such as a diesel engine driven generator, arranged to generate alternating current, and a rectifier R1 arranged to convert the alternating current to direct current to be fed into the main DC bus 3. The rectifier R1 may be provided with fuses dimensioned to blow in case of a fault in the rectifier R1.

The second power generating unit P2, the third power generating unit P3, and the fourth power generating unit P4 may have similar design as the first power generating unit P1. To this end, each of the second power generating unit P2, the third power generating unit P3, and the fourth power generating unit P4 can comprise a respective generator G2, G3, G4, and a respective rectifier R2, R3, R4 for providing DC signals to the main DC bus 3. It is however to be noted that a combination of different generators types is possible within the same system.

Each of the first drive unit D1 and the second drive unit D2 has a drive unit bus system DB comprising a first bus DB1 and a second bus DB2. Furthermore, each of the first drive unit D1 and the second drive unit D2 has a number of converter units, in the following exemplified by inverters I1, I2, I3, connected to their respective drive unit bus system DB, and fuses F arranged between the terminals of the inverters I1, I2, I3, and the drive unit bus system DB. An example of a suitable inverter is ABB's ACS800 inverter.

Each of the first drive unit D1 and the second drive unit D2 further has a first type of input unit 17 which at one end is arranged for connection with the main DC bus 3. At its other end the first type of input unit 17 is connected to the drive unit bus system DB. The first type of input unit 17 comprises an isolator switch arranged to disconnect the drive unit D1, D2 from the main DC bus 3, and a current blocking device 11 that is able to block current flow in a direction from the drive unit bus system DB to the main DC bus 3, and to allow current to flow in a direction from the main DC bus 3 to the drive unit bus system DB. Such a current blocking device may be a semiconductor device such as a diode or several diodes, or an insulated gate bipolar transistor (IGBT), thyristor, or similar device.

It is to be noted that depending on the application, drive units can be designed with different number of inverters, from one inverter to a plurality of inverters. Moreover, the first type of drive unit may in one embodiment comprise a semiconductor switching unit connected in anti-parallel with the current blocking device, thereby allowing reverse power feeding during normal operation of the DC-power system. Such a semiconductor switching unit may for instance be an insulated gate bipolar transistor (IGBT).

The energy storage unit E has an energy storage unit bus system EB having a first bus EB1 and a second bus EB2. The energy storage unit E further comprises power provision units such as a battery unit B and a capacitor bank C connected to the energy storage unit bus system EB, a DC-DC converter 15 connected to the energy storage unit bus system EB, and fuses F. The fuses F are arranged between the terminals of the DC-DC converter 15 and the energy storage unit bus system EB, between the capacitor bank C and the energy storage unit bus system EB, and between the battery unit B and the energy storage unit bus system EB.

By means of the DC-DC converter 15 the voltage level output of the battery unit B can be controlled if power is to be provided to the main DC bus 3 from the energy storage unit E.

It is to be noted that the energy storage unit E is an example of a many possible configurations regarding the number of power provision units and converters. For instance, some variations of the energy storage unit E do not have a capacitor bank. The general purpose of a capacitor bank in the energy storage unit is to assist in blowing fuses in the event of an internal fault.

The energy storage unit E further has a second type of input unit 9 which at one end is arranged for connection with the main DC bus 3. At its other end the second type of input unit 9 is connected to the energy storage unit bus system EB. The second type of input unit 9 comprises an isolator switch for disconnecting the energy storage unit E from the main DC bus 3, a semiconductor switching unit 13, and a current blocking device 11 that is able to block current flow in the direction from the energy storage unit bus system EB to the main DC bus 3, and to allow current to flow in a direction from the main DC bus 3 to the energy storage unit bus system EB. Such a current blocking device may be a semiconductor device such as a diode or several diodes, or an IGBT, thyristor, or similar device. The semiconductor switching unit 13 can for instance be an IGBT. The semiconductor switching unit 13 and the current blocking device 11 can be arranged in anti-parallel, thereby allowing current to flow in the direction from the energy storage unit bus system EB to the main DC bus 3 if the semiconductor switching device 13 is set in its saturated or open state by means of proper control signals. Hence, by means of the current blocking device 11 and the semiconductor switching unit 13, the current can selectively be allowed to bypass the current blocking device and flow to the main DC bus 3.

Figure 2:
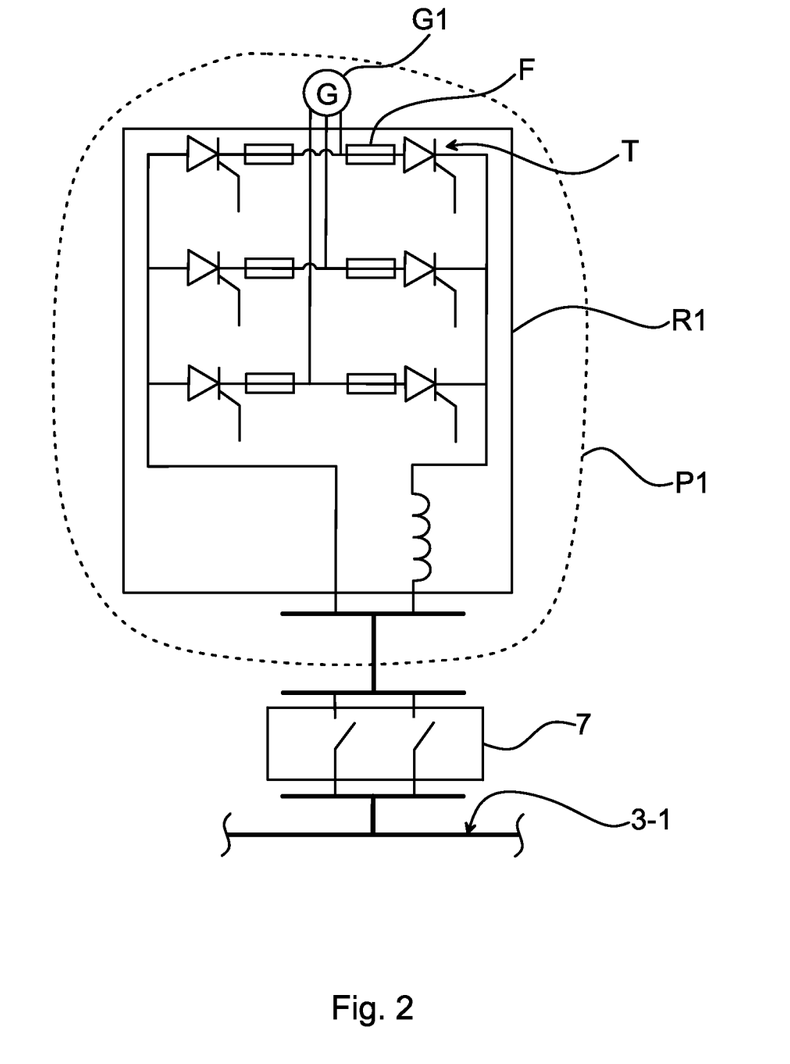
FIG. 2 is a schematic diagram of a power generating unit in the DC-power system in FIG. 1.

FIG. 2 is a schematic diagram of power generating unit P1. The internal components of the rectifier R1 are shown. For each electrical phase, the AC signal generated by the generator G1 is provided to a respective leg of the rectifier R1. Switching devices T are provided at each leg, which switching devices T can be controlled in such a way that a DC signal can be output by the rectifier R1. In the example in FIG. 2 the switching devices are exemplified by thyristors, although other switch means are also possible e.g. IGBTs. Furthermore, the rectifier R1 comprises fuses F for protection of the rectifier R1 in case of a fault, i.e. a short circuit, in the rectifier R1. In that case, one or more of the fuses will blow in response to fault currents flowing to the fault and through the fuses F. In the example in FIG. 2, each switching device T is associated with a fuse F. Thus, each leg, i.e. each phase, is associated with two fuses F. Other possible realisations of the power generating unit P1 include a crow bar design together with a diode on diode on the positive pole of the rectifier DC terminals. The general idea is that if an internal fault occurs, the rectifier with generator will isolate itself from the DC-power system to minimize the consequences for the wider system.

The fuses F in the rectifier are advantageously dimensioned such that they do not blow when subjected to fault currents as a result of faults downstream of the rectifier. The term downstream is to be understood in relation to a current flow direction in the DC-power system 1.

Figure 3A:
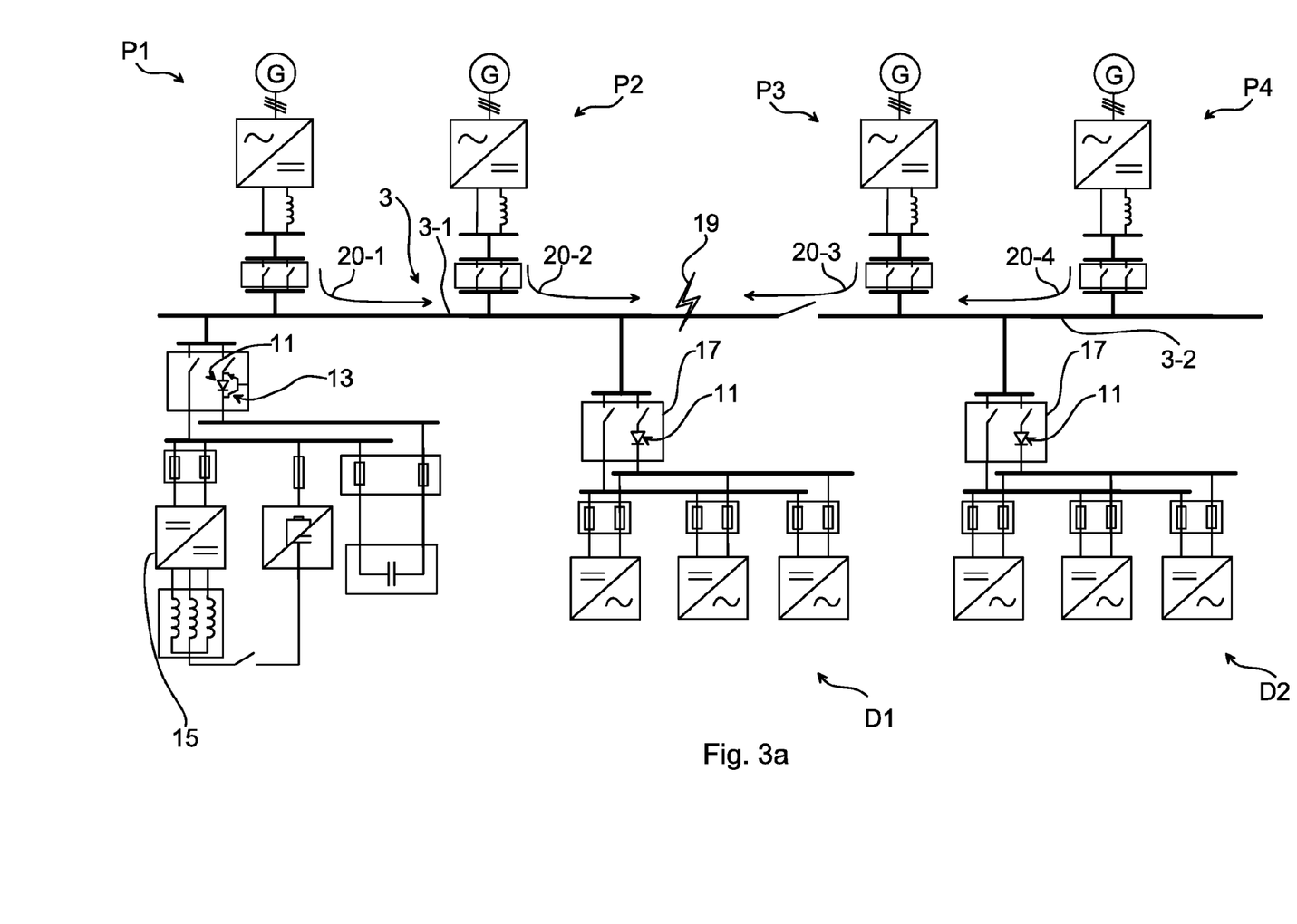
FIG. 3A depicts an example of a fault in the DC-power system in FIG. 1.

FIG. 3*a* is an example of a situation when a fault 19 has occurred in the DC-power system 1. In the example of FIG. 3*a*, the fault 19 is a short circuit and has occurred on the main DC bus 3. The fault 19 is hence a global fault. Several different fault-handling strategies are possible in this case.

In either case, due to the fault 19, fault currents 20-1, 20-2, 20-3, 20-4 flow to the location of the fault 19, which is on the first busbar 3-1 in this example. Generally, the fault 19 is detected by at least one of a plurality of sensors monitoring the DC-power system 1, e.g. current measuring sensors.

According to one strategy to handle the fault, the bustie breaker 5 is given the open command as the fault is detected. The healthy side, i.e. the second busbar 3-2 restarts automatically after the partitioning. Thus, once the DC-power system has been split the healthy side resumes operation. The faulty side, i.e. the first busbar 3-1, if aware of fault location, would not restart. If not aware of the location, due to lack of information, the faulty side would attempt a restart for detecting the fault.

In another version of the strategy, the rectifiers R1, R2, R3, R4 of the power generating units P1-P4 are controlled such that their current output tends towards zero, and any other energy source would also limit the current into the DC-power system whilst giving the open command to the bustie breaker 5. Once the system is split, the healthy side detects that the fault is cleared, whilst the faulty side will see the fault persist. This will cause the energy sources, e.g. the power generating units, on the faulty side to block current into fault.

In yet another version of the strategy the energy sources can limit their output voltage and currents to a level that would permit isolator switches to operate within their ratings, wherein the isolator switches 7 can disconnect power generating units from the main DC bus 3.

The first drive unit D1 and the second drive unit D2 do not contribute, or at least contribute minimally, to the fault current because of the current blocking feature of the current blocking devices 11. Furthermore, due to the isolator switches of the first type of input units 17, the first drive unit D1 and the second drive unit D2 can be disconnected from the main DC-bus 3. Thereby, each of the first drive unit D1 and the second drive unit D2 can be protected in case of a fault on the main DC bus 3.

The energy storage unit E is also protected during the fault 19 on the main DC bus 3. If the energy storage unit E was in the midst of providing power to the main DC bus 3 prior to the occurrence of the fault 19, the current output of the DC-DC converter 15 can be controlled, e.g. set to zero. Thereby, the energy storage unit E can be isolated from the main DC bus 3 by means of the isolator switch of the second type of input unit 9. Moreover, before the energy storage unit E is isolated from the main DC bus 3, the second type of input unit 9 can block current from flowing to the fault 19. This is obtained by means of the current blocking device 11 of the second type of input unit 9 and by setting the semiconductor switching unit 13 in its off-state.

By means of the current blocking properties of the first type of input device 17 and the second type of input device 9, the fault currents to the fault 19 can be reduced.

Figure 3B:
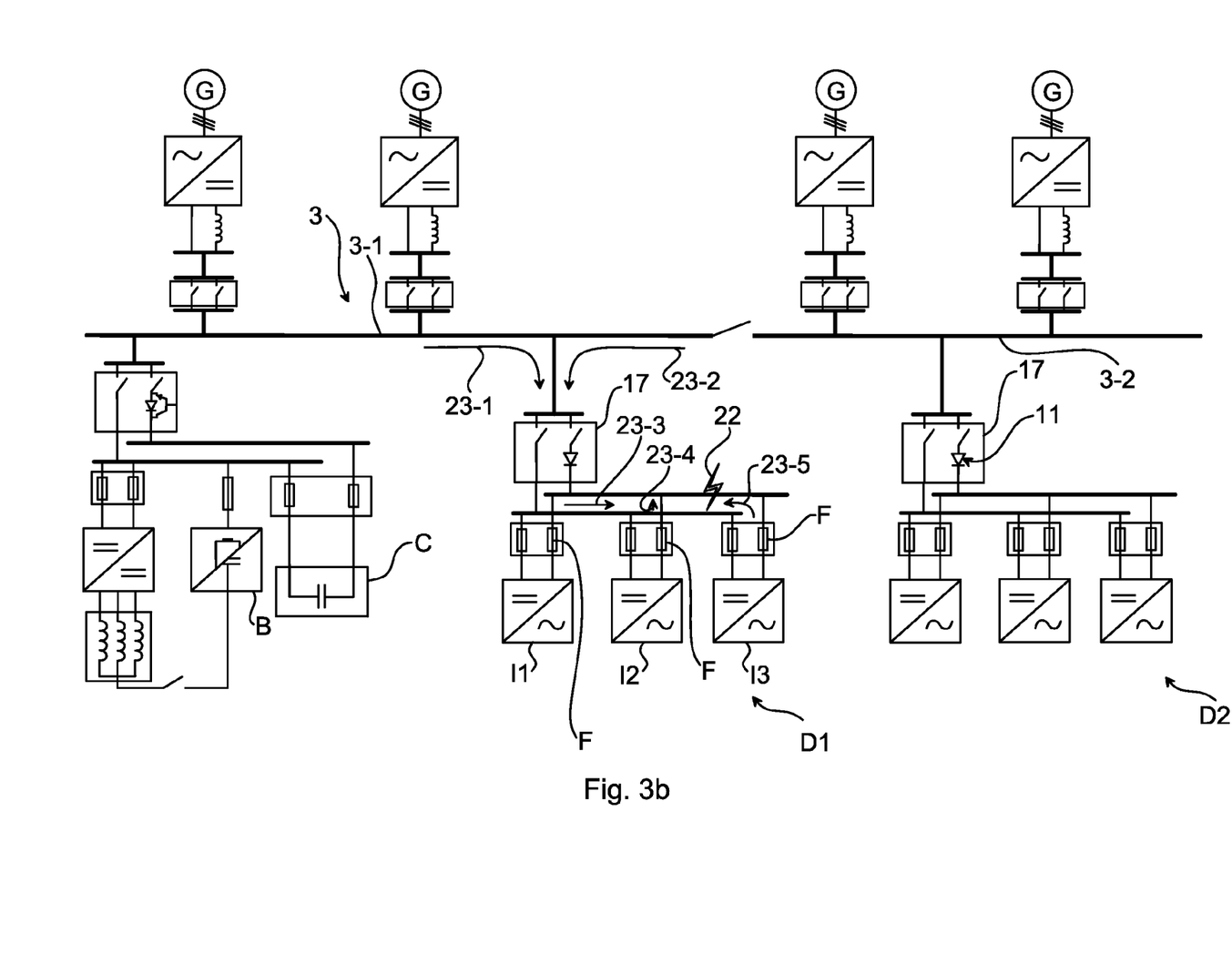
FIG. 3B depicts another example of a fault in the DC-power system in FIG. 1.

With reference to FIG. 3*b*, a situation where a fault 22 has occurred in the first drive unit D1 will now be described. This fault is hence a local fault in the first drive unit D1.

According to the example in FIG. 3*b*, a short circuit has occurred on the drive unit bus system DB. The first bus DB-1 and the second bus DB-2 may for instance be short circuited. When the fault 22 has occurred, currents 23-1, 23-2, 23-3, 23-4 and 23-5 flow to the fault 22. The currents 23-3, 23-4, 23-5 are provided by capacitor banks in the inverters I1, I2, I3. As the currents 23-3, 23-4, 23-5 provided by the capacitor banks flow through the fuses F arranged in the first drive unit D1, the fuses F will likely blow, thereby disconnecting the inverters I1, I2, I3 from the fault 22. The load connected to the inverters I1, I2, I3 is thereby disconnected from the drive unit bus system DB. As the current from the power generating units P1, P2, P3, P4 is reduced, e.g. by proper control of the rectifiers R1, R2, R3, R4, the isolator switch of the first type of input unit 17 of the first drive unit D1 can disconnect the first drive unit D1 from the main DC bus 3, and hence completely isolate the fault 22. When the fault 22 has been isolated, the remaining parts of the DC-power system 1 can resume normal operation.

Essentially no currents are provided to the fault 22 by capacitor banks of the second drive unit D2 because of the current blocking device 11 in the first type of input unit 17 of the second drive unit D2.

Furthermore, the second type of input unit 9 of the energy storage unit E can block current from flowing to the fault 22. This is obtained by means of the current blocking device 11 of the second type of input unit 9 and by setting the semiconductor switching unit 13 in its off-state.

Hence, by means of the current blocking properties of the first type of input device 17 and the second type of input device 9, the fault currents to the fault 22 can be reduced.

In situations when a fault occurs downstream of an inverter I1, I2, I3, such fault is typically handled by the fuses F of that inverter.

Generally, faults downstream of the fuses within a unit such as a power generating unit, energy storage unit or drive unit, is handled by the fuses of that unit.

The DC-power system described herein may advantageously be used as an on-board power system for powering a vessel, or as a power system in other confined spaces where large DC circuit breakers are undesirable. The present DC-power system is typically used in a low voltage environment, although higher voltage applications, e.g. medium voltage, are also envisaged.

The inventive concept has mainly been described above with reference to a few examples. However, as is readily appreciated by a person skilled in the art, other embodiments than the ones disclosed above are equally possible within the scope of the inventive concept, as defined by the appended claims. For instance, a DC-power system according to the present disclosure can include fewer or more power generating units than in the example described in FIG. 1. Moreover, the DC-power system does not have to include an energy storage unit or it can include additional energy storage units, and/or fewer or more drive units.

What is claimed is:

1. A DC-power system for powering a vessel, comprising:
 a main DC bus,
 a power generating unit feeding the main DC bus with an output voltage and current,
 a first disconnector arranged between the main DC bus and the power generating unit for isolating the power generating unit from the main DC bus in case of a main DC bus fault, wherein when a fault has occurred in the DC-power system, the power generating unit is configured to limit the output voltage and current to a level that permits the first disconnector to operate within its rating, and a drive unit being fed by the main DC bus, wherein the drive unit comprises a drive unit bus system, converter units connected to the drive unit bus system, and fuses (F) arranged between the drive unit bus system and the converter units for protecting the converter units in case of a drive unit fault, wherein the drive unit comprises a first input unit arranged between the main DC bus and the drive unit bus system, and wherein the first input unit comprises a second disconnector for disconnecting the drive unit from the main DC bus in case of a drive unit fault.

2. The DC-power system as claimed in claim 1, wherein the first input unit comprises a first current blocking device blocking currents in a direction from the drive unit bus system to the main DC bus and providing current flow from the main DC bus to the drive unit.

3. The DC-power system as claimed in claim 2, wherein the first current blocking device is a diode.

4. The DC-power system as claimed in claim 2, wherein the first input unit comprises a semiconductor switching unit connected in anti-parallel with the first current blocking device for selectively allowing current to bypass the first current blocking device and flow to the main DC bus.

5. The DC-power system as claimed in claim 1, further comprising an energy storage unit feeding the main DC bus, wherein the energy storage unit comprises an energy storage unit bus system, power provision units, and fuses arranged between the energy storage unit bus system and the power provision units for protection of the power provision units in case of an energy storage unit fault.

6. The DC-power system as claimed in claim 5, wherein the energy storage unit comprises a second input unit arranged between the energy storage unit bus system and the main DC bus, wherein the second input unit comprises a third disconnector for disconnecting the energy storage unit from the main DC bus in case of an energy storage unit fault.

7. The DC-power system as claimed in claim 6, wherein the second input unit comprises a second current blocking device blocking currents in a direction from the energy storage unit bus system to the main DC bus and to providing current flow from the main DC bus to the energy storage unit, and a semiconductor switching unit selectively allowing current to bypass the second current blocking device and flow to the main DC bus.

8. The DC-power system as claimed in claim 7, wherein the second current blocking device and the semiconductor switching unit are connected in anti-parallel.

9. The DC-power system as claimed in claim 1, wherein the power generating unit comprises a generator and a rectifier, wherein the rectifier includes a plurality of fuses configured to protect the rectifier in case of a rectifier fault.

10. The DC-power system as claimed in claim 9, wherein the plurality of fuses included in the rectifier are dimensioned such that they do not blow when subjected to fault currents as a result of faults downstream of the rectifier.

11. The DC-power system as claimed in claim 1, further comprising:
energy sources feeding the main DC bus, and
source disconnectors arranged between the main DC bus and the energy sources and configured to isolate the energy sources from the main DC bus,
wherein the energy sources are configured to limit their output voltages and currents to a source level that permits the source disconnectors to operate within their ratings.

12. The DC-power system as claimed in claim 1, wherein each converter unit has terminals connected to the drive unit bus system, wherein each terminal of at least one of the converter units is connected to a fuse.

13. A method of handling a fault in a DC-power system comprising a main DC bus, power generating units configured to feed the main DC bus, a first disconnector arranged between the main DC bus and each power generating unit for isolating the power generating unit from the main DC bus, and a drive unit configured to be fed by the main DC bus, wherein the drive unit comprises a drive unit bus system, converter units connected to the drive unit bus system, and fuses arranged between the drive unit bus system and the converter units for protecting the converter units in case of a drive unit fault, wherein the drive unit comprises a first input unit arranged between the main DC bus and the drive unit bus system, and wherein the first input unit comprises a second disconnector for disconnecting the drive unit from the main DC bus in case of a drive unit fault, wherein the method comprises:
limiting, in a situation when a fault has occurred in the DC-power system, a voltage output and current of each power generating unit to a level that permits the respective first disconnector to operate within its ratings, wherein the first disconnectors are configured to disconnect the power generating units from the main DC bus.

14. The method as claimed in claim 13, wherein the power generating units comprise generators and rectifiers, wherein the step of limiting comprises controlling the rectifiers such that their output voltages and currents are limited to a level that permits the first disconnectors to operate within their ratings.

* * * * *